United States Patent Office 3,159,421
Patented Dec. 1, 1964

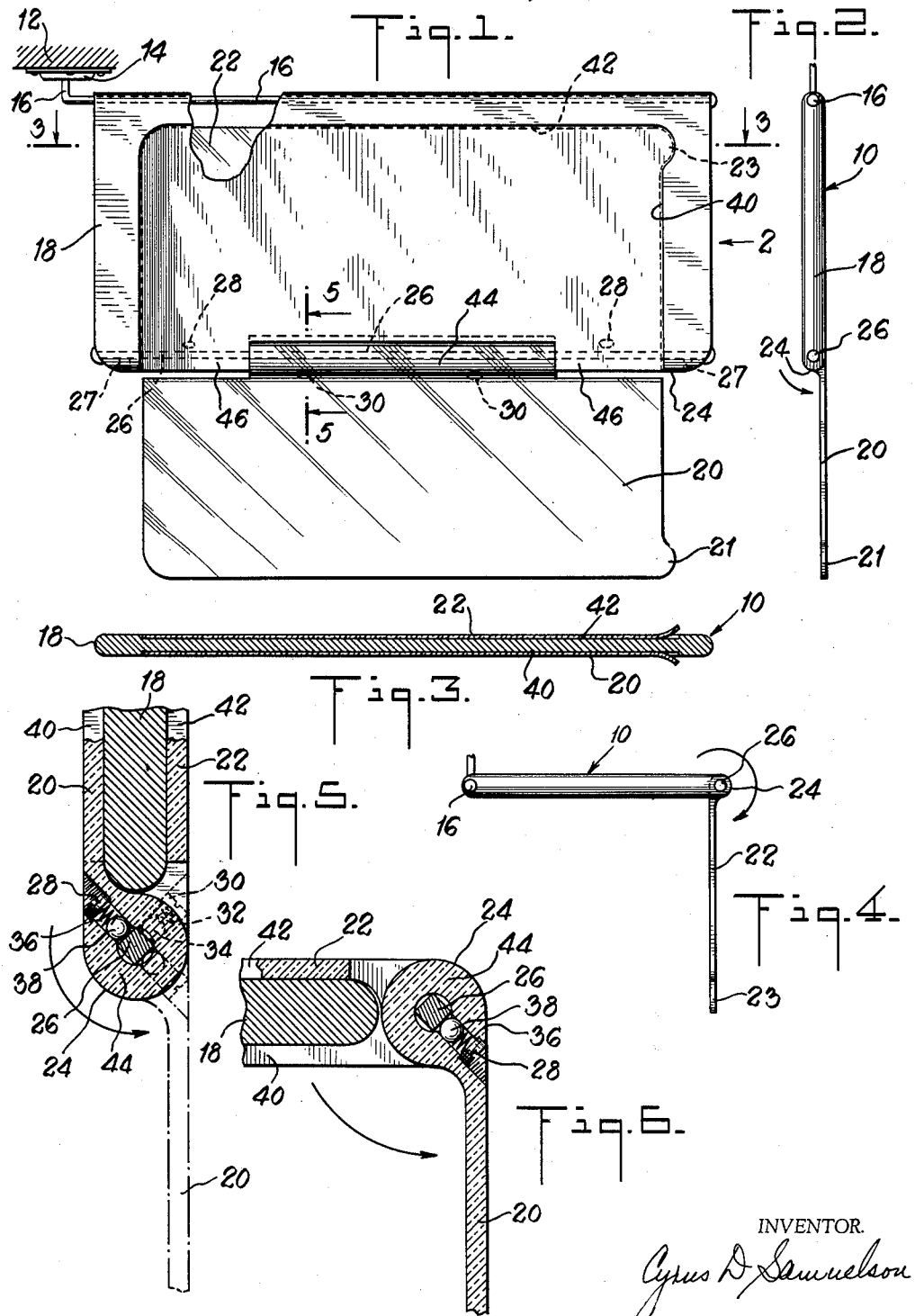
Dec. 1, 1964 — C. D. SAMUELSON — 3,159,421
AUTOMOBILE SUN VISOR WITH AUXILIARY TRANSPARENT PANEL
Filed Jan. 23, 1963
INVENTOR.
Cyrus D. Samuelson

3,159,421
AUTOMOBILE SUN VISOR WITH AUXILIARY TRANSPARENT PANEL
Cyrus D. Samuelson, River Edge, N.J.
(100 Prospect Ave., Hackensack, N.J.)
Filed Jan. 23, 1963, Ser. No. 253,447
2 Claims. (Cl. 296—97)

The invention relates to automobile sun visors and in particular to those which carry colored transparent panels for use under certain light conditions.

Generally, opaque sun visors are provided with automobiles being marketed at the present time. These sun visors are essentially shades and are designed to shade the eyes from direct rays, particularly, those of the sun. Many automobile dealers and automobile accessory stores market colored transparent panels which may be affixed to the visor and flipped into position in the line of vision of the driver or the front seat passenger. These panels are usually of green and are intended to reduce the intensity of the illumination reaching the driver's eyes. The green colored panels are generally useful for reducing excessive daytime illumination but reduce visibility too much when used in artificial illumination.

Less frequently, automobles are equipped with transparent amber panels for use when driving at night. These panels reduce the glare without impairing the driver's nighttime visibility. Unfortunately, the amber panels are not very useful during the day under conditions of bright sunlight or the high glare resulting from the reflection of light from white sand or snow.

It is not feasible to mount both a green panel and an amber panel on the opaque sun visor presently supplied on automobiles. In addition, it is not feasbile to mount a transparent panel on a sun visor because the bar on which the transparent panel is mounted extends beyond the edge of the sun visor. This introduces the hazard of the driver's striking his head on the sharp edge in an accident. The same hazard exists for the front seat passenger if the sun visor on his side of the car is equipped with an added transparent panel.

It is an important object of the invention to provide an automobile sun visor in which a transparent panel is mounted so that the transparent panel, when out of use, nests in a cavity in the visor and, when in use, is pivoted to several positions.

It is a further object of the invention to provide an automobile sun visor in which two pivoted transparent panels are nested in cavities in the sun visor.

These and other objects, advantages, features and uses will be apparent during the course of the following specification when considered together with the accompanying drawings wherein:

FIGURE 1 is a side elevational view of a sun visor assembly of the invention with the rear transparent panel in the down position;

FIGURE 2 is an end elevational view of the sun visor assembly of FIGURE 1, viewed in the direction of arrow 2 of FIGURE 1;

FIGURE 3 is a transverse sectional view taken along the lines 3—3 of FIGURE 1, viewed in the direction of the arrows, showing both transparent panels in their nested positions;

FIGURE 4 is an end elevational view of the sun visor assembly of the invention, showing the opaque sun visor in the up position and the front transparent panel in the down position;

FIGURE 5 is an enlarged fragmentary sectional view along the lines 5—5 of FIGURE 1, viewed in the direction of the arrows, showing the means for positioning the transparent panels and with the solid lines showing the transparent panels in their nested positions and with the dotted lines showing the rear transparent panel in the down position; and FIGURE 6 is an enlarged fragmentary sectional view of the sun visor assembly of the invention showing the sun visor in the up position and the rear transparent panel in the down position.

For the purpose of this specification, I define the terms used herein as follows: The term "sun visor" or "housing" means the opaque visor which is normally used to shade the car occupant's eyes. The term "transparent panel" means the units used by the car occupants to cut down the glare of external light. The term "sun visor assembly" denotes the device of the invention which includes the sun visor and the transparent panels. By the term "up" I mean the position in which the sun visor and/or the transparent panels are not being used by the car occupants. By the term "down" I mean the positions in which the sun visor and/or the transparent panels are being used by the car occupants. By the "front transparent panel" I mean the transparent panel which faces the car occupant when the sun visor is in the down position. By "the rear transparent panel" I mean the transparent panel which is behind the sun visor, as viewed by the car occupant, when the sun visor is down.

In the drawings, wherein, for the purpose of illustration, is shown a preferred embodiment of the invention, the numeral 10 designates the sun visor assembly generally. Sun visor assembly 10 is pivotally mounted on rod 16 which is mounted in plate 14. Plate 14 is affixed to car body 12 and is provided with a socket permitting rod 16 to be moved to allow the sun visor assembly to be used at the front or the side of the automobile.

Sun visor assembly 10 is seen to comprise sun visor 18, front transparent panel 20 and rear transparent panel 22. Transparent panels 20 and 22 pivot on bar 26 which is flat-sided as shown in FIGURES 5 and 6 and is held from rotation within sun visor 18 by means of set screws 27. Transparent panel 22 is held in contact with bar 26 by means of screws 30, springs 32 and balls 34. It can be seen that the position of the transparent panel is determined by the cooperaion of the flat portion of the bar and the balls. As the transparent panel is pivoted by the user, the springs are depressed as the balls pass over the edges between the flats on the bar. As the balls come in contact with the flat portion of the bar, the springs expand and hold the panel in that position.

Transparent panel 22 is provided with tab 23 to facilitate its easy removal from cavity 42 in sun visor 18. Transparent panel 20 is similarly provided with tab 21 to facilitate its easy removal from cavity 40. Transparent panel 20 is pivotally mounted to bar 26 by means of screws 28, springs 36 and balls 38. Hinge 44 is used to mount transparent panel 20 to bar 26 and hinges 46 are used to mount transparent panel 22 to bar 26. Hinges 44 and 46 are spaced so that one transparent panel does not interfere with the pivotal movement of the other.

Edge 24 of sun visor 18 is smooth and may be padded to reduce the danger of injury to the car occupants in the event that they hit their heads on the edge of the sun visor assembly in an accident.

By way of illustration but without limiting the scope of the invention, following is an example of a sun visor assembly of the invention: transparent panel 20 is formed of green plastic, glass or other similar material and transparent panel 22 is formed of amber plastic, glass or other similar material. It is also within the contemplation of the invention to provide sun visor assemblies with a single transparent panel which nests in the sun visor.

Sun visors of the invention are used as follows:

Daytime—shade only desired: move the sun visor assembly down to the desired position, leaving the transparent panels nested in the sun visor.

Daytime—glare reduction only desired: move transparent panel 20 down to the desired position, leaving the sun visor in the up position.

Daytime—shade and glare reduction desired: move both the sun visor and transparent panel 20 down to their desired positions.

Nighttime—glare reduction desired: move transparent panel 22 to its desired position, leaving sun visor 18 in the up position.

While I have disclosed my invention in relation to a specific example and in a specific embodiment, I do not wish to be limited thereto, for obvious modifications will occur to those skilled in the art without departing from the spirit and scope of my invention.

Having thus described the invention, I claim:

1. A sun visor assembly for a vehicle comprising:
   a flat housing of opaque material having a cavity formed in at least one surface thereof;
   a rod adapted to be affixed to the housing along one edge thereof such that the housing may be pivoted about the rod;
   one end of the rod being affixed to the vehicle so as to be movable with respect thereto;
   a bar having a plurality of flat faces mounted at the edge of the housing opposite the edge affixed to the rod;
   a transparent panel mounted on the bar by means of at least one combination comprising a ball in contact with the bar, a spring in contact with the ball and means for holding the spring in place;
   the spring being sufficiently compressed so as to cause the ball to maintain contact with the bar and so that the transparent panel is held in position with respect to the flat housing when the ball is in contact with one of the flat faces of the bar;
   the transparent panel being capable of assuming a plurality of fixed positions with respect to the flat housing;
   the transparent panel being shaped to nest in the cavity.

2. A sun visor assembly for a vehicle comprising:
   a flat housing of opaque material having a pair of cavities formed therein such that there is a cavity in each of the opposite surfaces thereof;
   a rod adapted to be affixed to the housing along one edge thereof such that the housing may be pivoted about the rod;
   one end of the rod being affixed to the vehicle so as to be movable with respect thereto;
   a bar having a plurality of flat faces mounted at the edge of the housing opposite the edge affixed to the rod;
   a pair of transparent panels;
   each of the transparent panels being mounted on the bar independent of the other by means of at least one combination comprising a ball in contact with the bar, a spring in contact with the ball and means for holding the spring in place;
   the spring being sufficiently compressed so as to cause the ball to maintain contact with the bar and so that the associated transparent panel is held in position with respect to the flat housing when the ball is in contact with one of the flat faces of the bar;
   each transparent panel being capable of assuming a plurality of fixed positions with respect to the flat housing;
   the transparent panels being shaped and mounted such that each of them may nest in a respective one of the cavities.

References Cited in the file of this patent

UNITED STATES PATENTS

| | | |
|---|---|---|
| 1,913,277 | Hoople | June 6, 1933 |
| 2,029,534 | Knapp | Feb. 4, 1936 |
| 2,107,247 | Johnson | Feb. 1, 1938 |
| 2,204,691 | Olsen | June 18, 1940 |
| 2,237,700 | Goldman | Apr. 8, 1941 |
| 2,492,074 | Thompson | Dec. 20, 1949 |
| 2,547,101 | Uttz | Apr. 3, 1951 |
| 2,793,072 | Lowe | May 21, 1957 |